(12) United States Patent
Chiao et al.

(10) Patent No.: US 10,280,898 B1
(45) Date of Patent: May 7, 2019

(54) MICRO-SYSTEMS INCLUDING MICRO-WINDMILLS AND METHODS OF FORMING MICRO-SYSTEMS INCLUDING MICRO-WINDMILLS

(71) Applicant: Board of Regents, The University of Texas System, Austin, TX (US)

(72) Inventors: Jung-chih Chiao, Grand Prairie, TX (US); Smitha M N Rao, Euless, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1084 days.

(21) Appl. No.: 14/594,035

(22) Filed: Jan. 9, 2015

Related U.S. Application Data

(60) Provisional application No. 61/926,182, filed on Jan. 10, 2014, provisional application No. 61/925,527, filed on Jan. 9, 2014.

(51) Int. Cl.
  *H02K 7/18* (2006.01)
  *F03D 9/00* (2016.01)
  *H02N 2/18* (2006.01)

(52) U.S. Cl.
  CPC .............. *F03D 9/002* (2013.01); *H02K 7/183* (2013.01); *H02N 2/185* (2013.01)

(58) Field of Classification Search
  CPC ........... F04D 25/0613; F03D 5/06; F03D 5/04
  See application file for complete search history.

(56) References Cited

U.S. PATENT DOCUMENTS

| | | | | |
|---|---|---|---|---|
| 4,353,003 A * | 10/1982 | Sommers | .................. | F03G 6/00 310/306 |
| 4,738,594 A * | 4/1988 | Sato | ...................... | F04D 29/388 416/213 A |
| 5,123,814 A * | 6/1992 | Burdick | ................ | F04D 29/388 29/889.3 |
| 5,702,273 A * | 12/1997 | Cho | ......................... | B63G 8/08 114/337 |
| 5,874,798 A * | 2/1999 | Wiegele | .................. | F01D 1/026 310/168 |
| 7,074,016 B1 * | 7/2006 | Epstein | ..................... | F01D 1/06 415/84 |
| 8,102,073 B2 * | 1/2012 | Morrison | .................. | F03D 9/25 290/44 |
| 8,294,336 B2 * | 10/2012 | Priya | ..................... | C04B 35/493 310/339 |
| 8,674,538 B2 * | 3/2014 | Lugg | ........................ | F03D 1/025 290/44 |
| 8,678,749 B2 * | 3/2014 | Saitoh | ..................... | F01D 1/026 415/90 |
| 2013/0200759 A1 * | 8/2013 | Horng | .................. | H02K 21/222 310/68 R |

* cited by examiner

*Primary Examiner* — Justin D Seabe
(74) *Attorney, Agent, or Firm* — Parks IP Law LLC

(57) ABSTRACT

Micro-windmills, micro-systems including micro-windmills, and methods of forming the same are described. The micro-systems with a micro-windmill are configured to withstand wind pressures and environmental conditions and can be used for various applications.

9 Claims, 10 Drawing Sheets

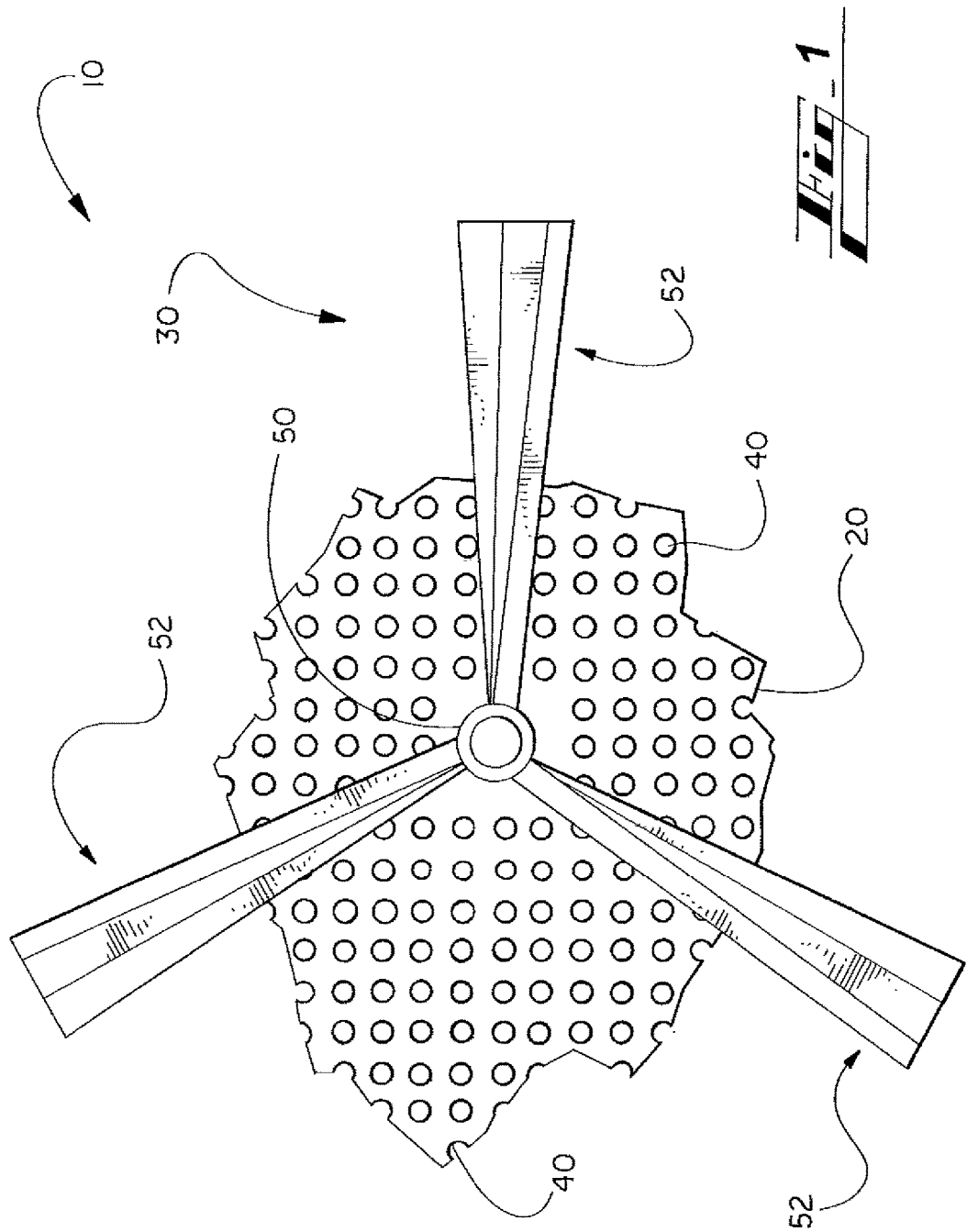

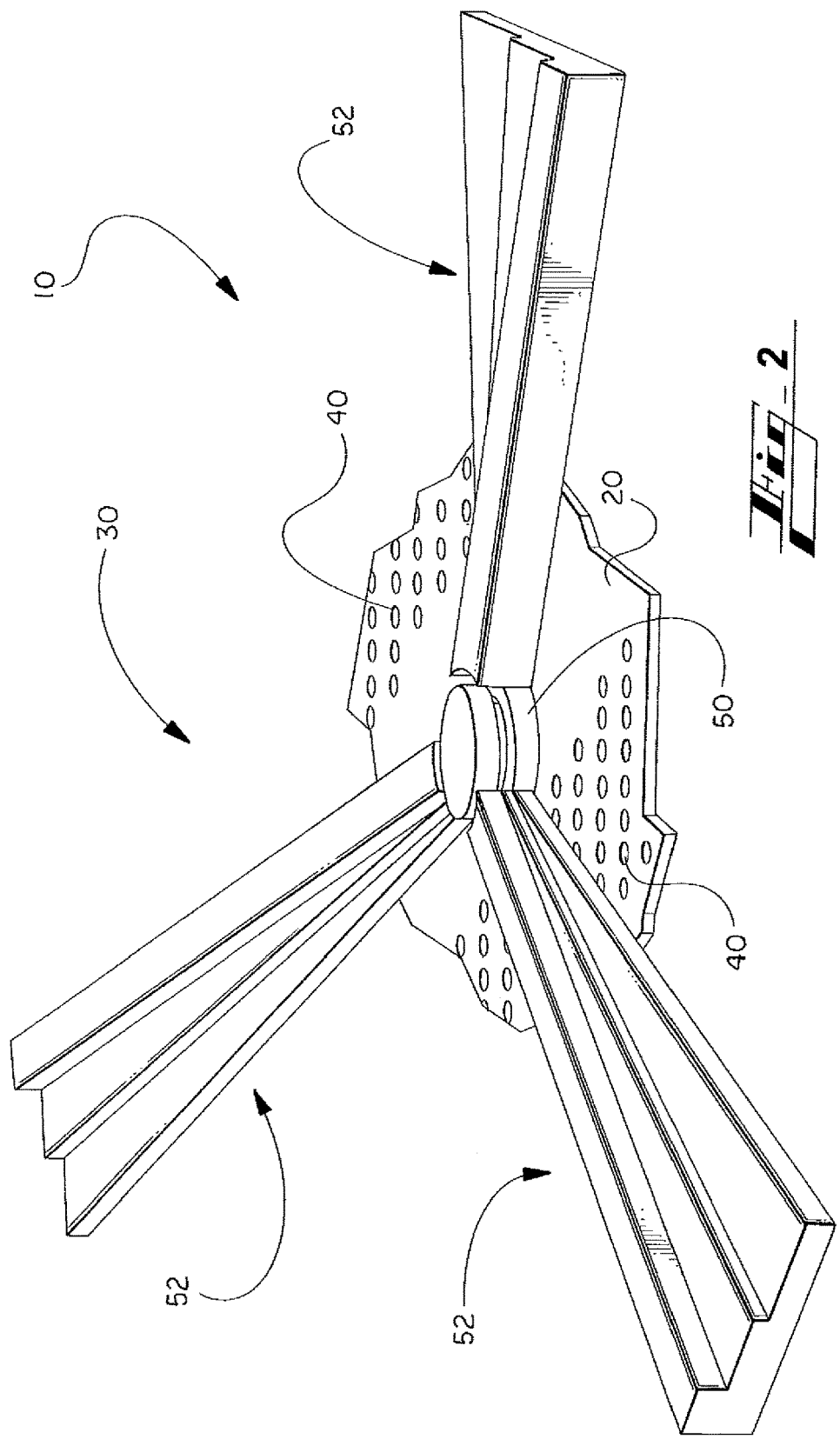

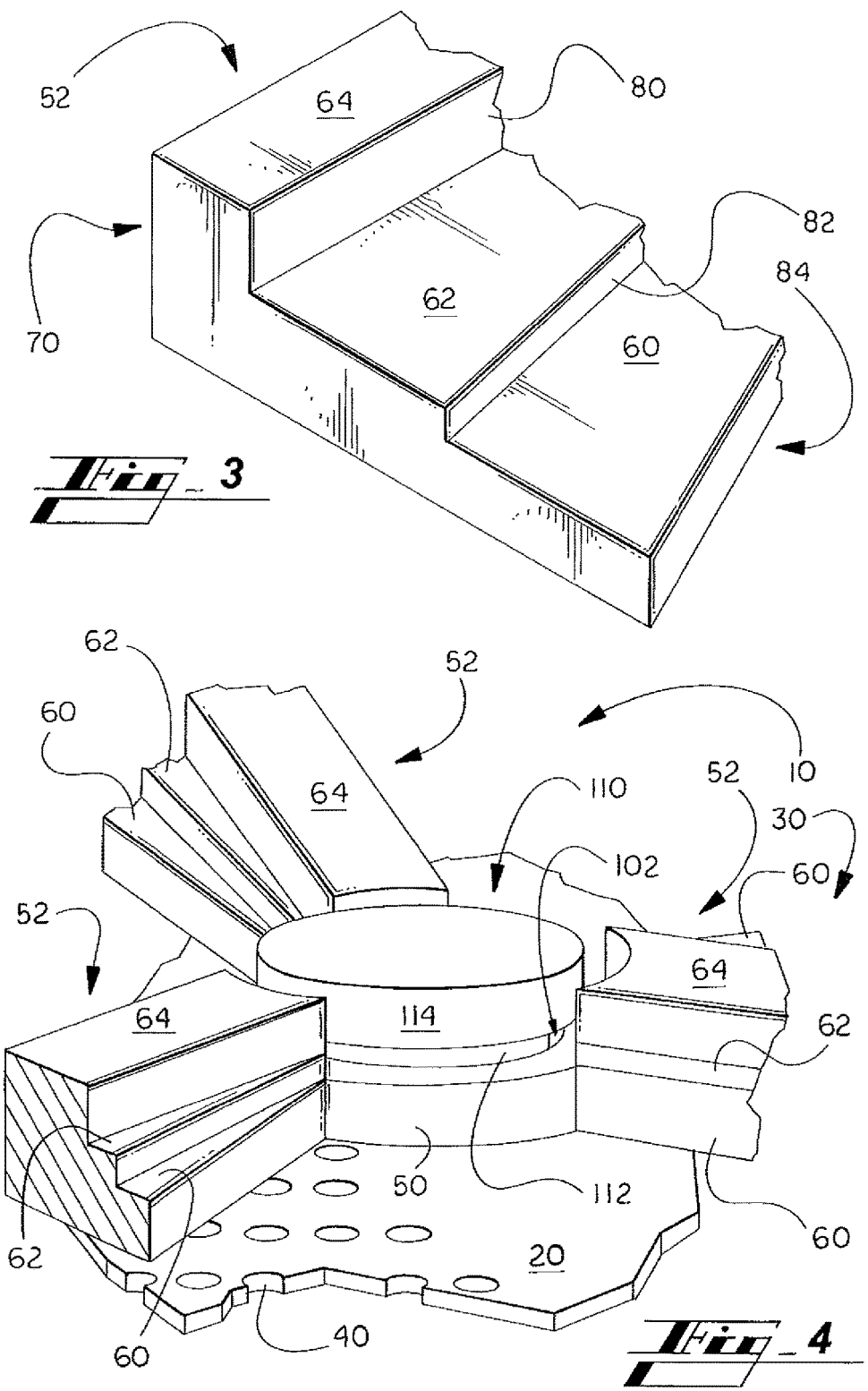

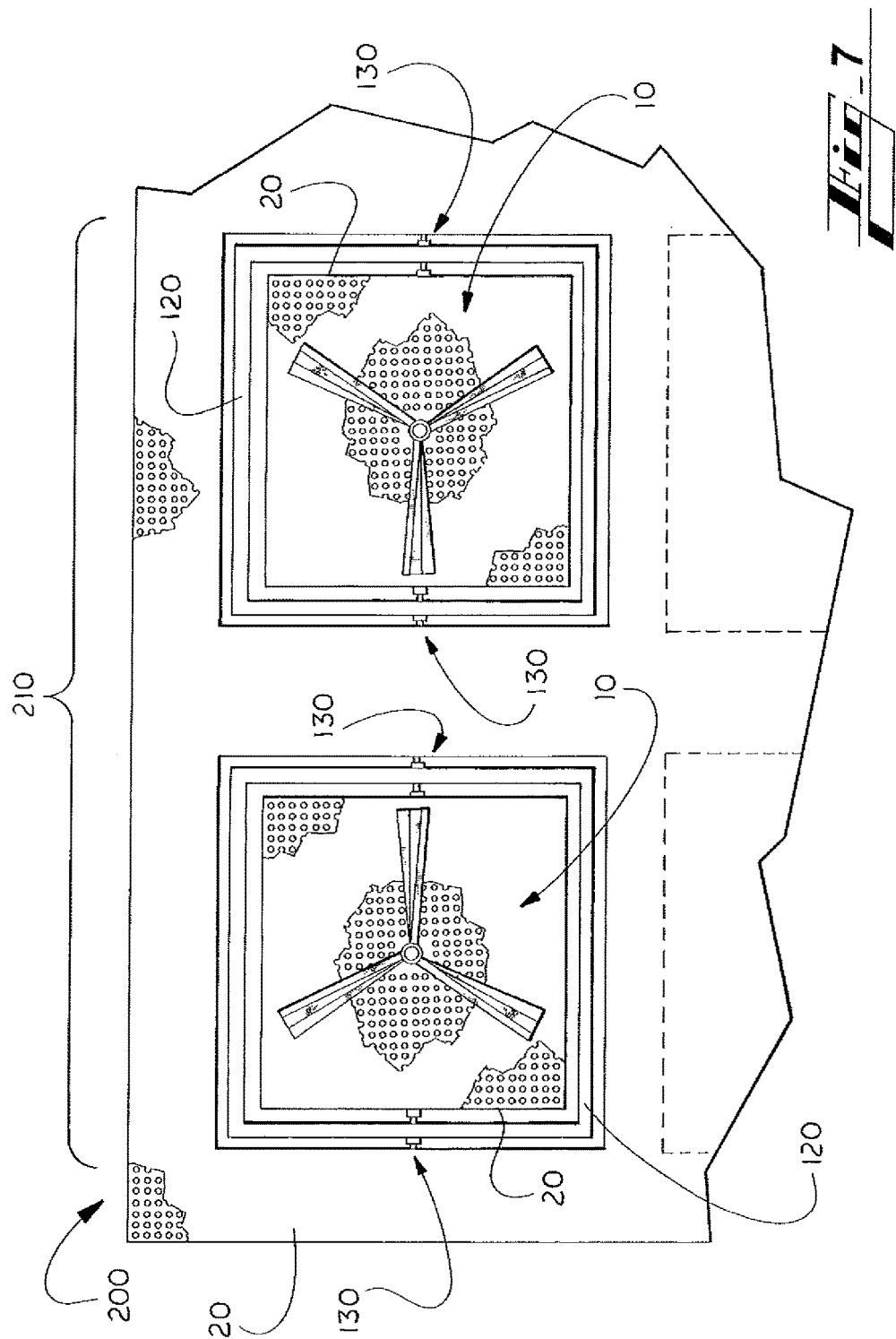

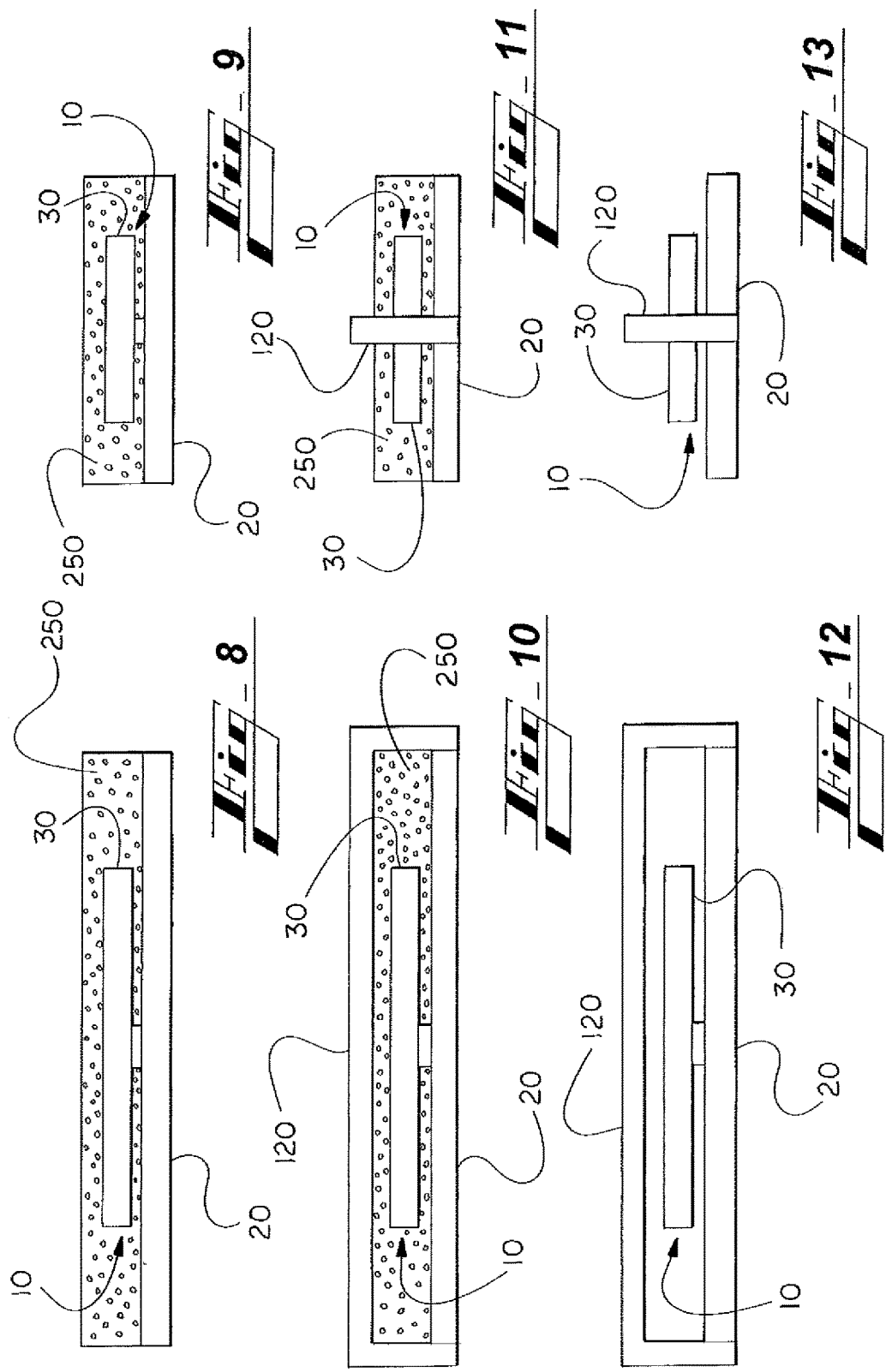

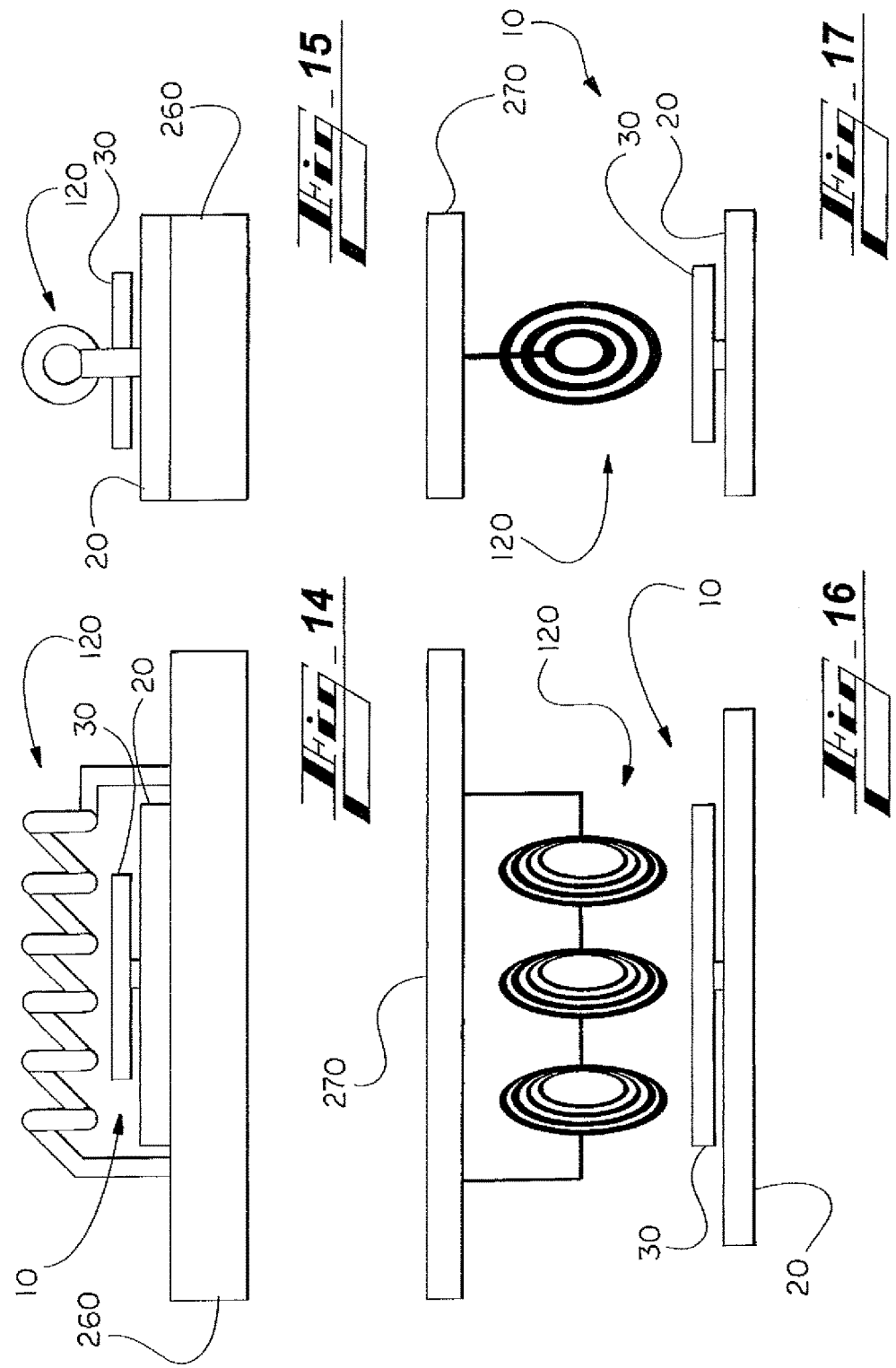

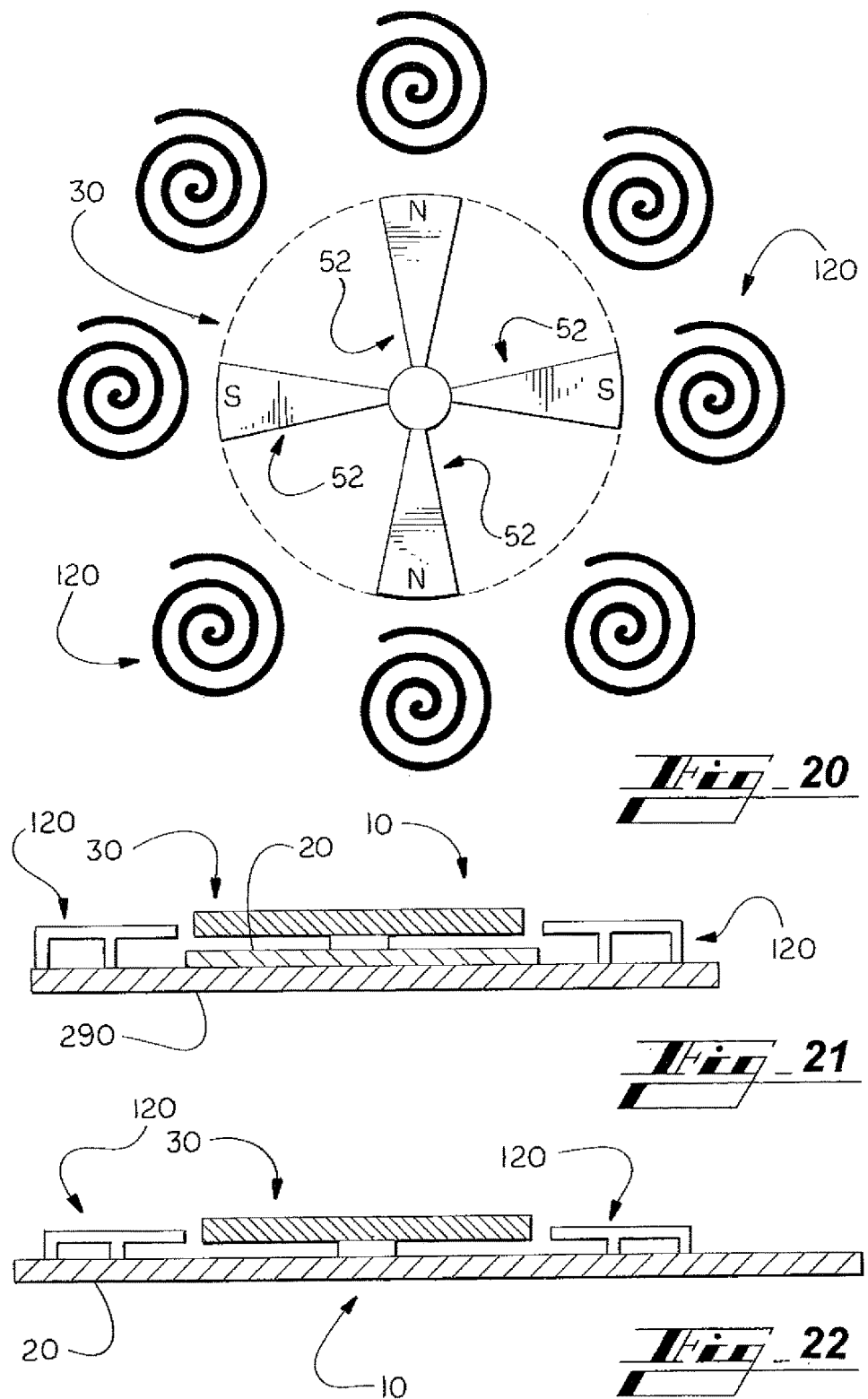

MICRO-SYSTEMS INCLUDING MICRO-WINDMILLS AND METHODS OF FORMING MICRO-SYSTEMS INCLUDING MICRO-WINDMILLS

TECHNICAL FIELD

The present disclosure relates generally to micro-systems including micro-windmills and methods of forming micro-systems including micro-windmills.

BACKGROUND

Large windmills are used to harvest wind power. While they are practical for large scale energy generation, they are not suitable for small scale use such as in houses, buildings, cars, or remote sensors. They can also be fragile if they are made on meter or centimeter scales.

Current micro-windmills have limitations. One limitation is that some of these micro-windmills cannot be actuated with air flow. Another limitation is that some of these micro-windmills are not oriented in a way so as to be robust under wind pressure that will generally be applied. For example, these micro-windmills are vertically oriented. Still another limitation is that some of these micro-windmills are made out of materials that are too brittle for certain applications. For example, these micro-windmills are made out of polysilicon and silicon dioxide sacrificial layers. A polysilicon layer with a thickness, for example of one micrometer, is fragile and may not survive under wind pressure that is generally applied.

SUMMARY

What is needed is a micro-system with a micro-windmill that can be configured to withstand wind pressures and environmental conditions and that can be used for various applications. The present technology relates to micro-systems including micro-windmills. For example, the micro-systems include micro-electrical-mechanical systems (MEMS) include micro-mechanical-systems.

In certain embodiments, the micro-systems are formed from non-brittle material such as nickel alloys using monolithic electroplating fabrication techniques.

The micro-windmills of the micro-systems provide a number of advantages. For example, the micro-windmills: (1) are small enough to conform to surfaces; (2) exhibit increased efficiency due to a small mass to motion ratio; (3) exhibit greatly reduced resistance to wind, increasing robustness; (4) can be configured as a large array, which can fit onto a small footprint and which provides redundancy to the energy harvester in case of damage to a few micro-windmills; (5) can be integrated monolithically on existing electronic devices, enabling self-powering for remote sensors in a sensor network; (6) can be made on a large surface with batch processes; and (7) can be constructed of nickel-alloy to make them strong. By making the micro-windmills on a large surface a batch process, the cost of making one micro-windmill is the same as making thousands of micro-windmills and the unit price for each micro-windmills can be reduced.

Other aspects of the present invention will be in part apparent and in part pointed out hereinafter.

DESCRIPTION OF THE DRAWINGS

FIG. 1 illustrates a partial top view of a micro-windmill, according to an embodiment of the present disclosure.

FIG. 2 illustrates a partial perspective view of the micro-windmill of FIG. 1.

FIG. 3 illustrates a partial perspective view of a vane of the micro-windmill of FIG. 2.

FIG. 4 illustrates a partial perspective view of a connection between a fan and a substrate of the windmill of FIG. 2.

FIG. 7 illustrates a micro system including an array of micro-windmills.

FIG. 8 is a front view of a first step of a method of forming a microstructure.

FIG. 9 is a side view of the first step of the method of forming the microstructure.

FIG. 10 a front view of a second step of the method of forming the microstructure.

FIG. 11 is a side view of the second step of the method of forming the microstructure.

FIG. 12 is a front view of a third step of the method of forming the microstructure.

FIG. 13 is a side view of the third step of the method of forming the microstructure.

FIG. 14 illustrates a front view of a micro-system including a micro-windmill and a coil, according to an embodiment of the present disclosure.

FIG. 15 is a side view of the micro-system of FIG. 14.

FIG. 16 illustrates a front view of a micro-system including a micro-windmill and a coils, according to an embodiment of the present disclosure.

FIG. 17 is a side view of the micro-system of FIG. 16.

FIG. 20 illustrates a top schematic view of elements of a micro-system including a micro-windmill and an array of coils, according to an embodiment of the present disclosure.

FIG. 21 is a front view of the micro-system of FIG. 20.

FIG. 22 illustrates a front of a micro-system including a micro-windmill and an array of coils, according to an embodiment of the present disclosure.

Figure 5:
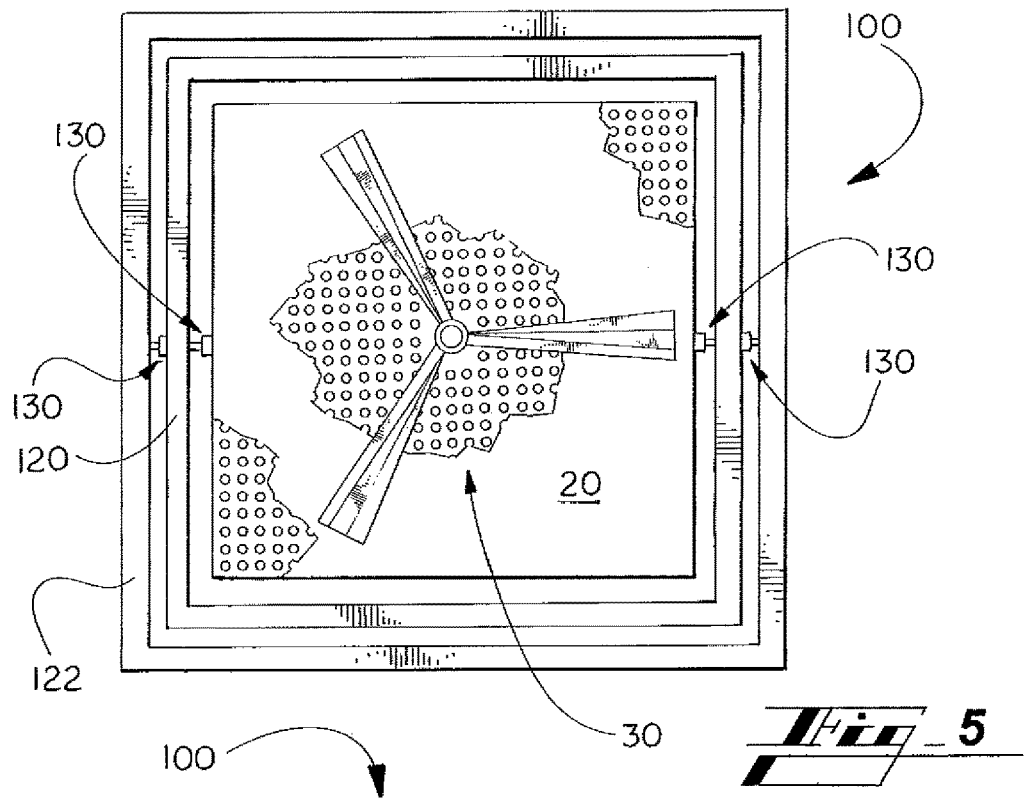
FIG. 5 illustrates a plan view of a micro-system including a micro-windmill and coils, according to an embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The present disclosure describes micro-systems that include micro-windmill. An exemplary micro-windmill 10 is now generally described and exemplary micro-systems that include a micro-windmill are described in further detail below.

Referring to FIGS. 1 and 2, the micro-windmill 10 includes a substrate 20 and a fan 30 that is rotably connected to the substrate 20. The fan 30 is configured to rotate in a plane that is substantially parallel to a plane defined by the substrate 20.

In certain embodiments, the substrate 20 has a plurality of holes 40. The holes 40 make the substrate lighter without affecting the structural support of the substrate 20. The holes 40 also allow airflow through the substrate 20, which reduces air pressure on the substrate 20.

The fan 30 includes a hub 50 and vanes 52 that extend outwardly from the hub 50. In the illustrated embodiment, the fan 30 includes three vanes 52 that are arranged with a one-hundred-twenty degree angle between adjacent vanes 52. The arrangement of the vanes 52 serves to balance the motion of the fan 30.

Referring to FIG. 3, each vane 52 includes multiple structural layers. In the illustrated embodiment, each vane 52 includes three layers: a bottom layer 60, a middle layer 62, and a top layer 64.

Each of the bottom layer 60 and the middle layer 62 spreads outwardly, the width increasing in the radial direction (e.g., a fan-shaped design). For example, each of the bottom layer 60 and the middle layer 62 has an angle in a range of five degrees to ten degrees, with the bottom layer 60 having a larger angle than the middle layer 62.

More generally, each layer is slightly smaller than the underlying layer, the layers 60, 60, 62 are aligned along a first side 70, and the layers 60, 62, 64 are physically connected to one another. This arrangement creates gradually narrowing vertical steps 80, 82 at a second side 84.

The steps 80, 82 give each vane 52 an angle that converts airflow over the vane 52 (e.g., airflow in a direction substantially perpendicular to the plane in which the fan 30 rotates) into rotation of the fan 30. In other words, when the airflow pressure is applied to the vanes 52, the steps 80 of the vanes 52 offer resistance to the airflow leading to rotational movement of the fan 30. The mass of the vanes 52 is very small so that a small airflow pressure can cause the fan 30 to move at a high speed.

The position of the steps 80, 82 determines the direction of rotation of the fan 30 and the direction that the fan 30 is rotated to generate airflow. To make the fan 30 rotate in the opposite rotation, the steps 80, 82 are arranged at the first side 70 and the layers are aligned along the second side 84.

The structures of the micro-windmill described above and the micro-systems described below can be fabricated monolithically in batch processes with multi-layer electroplating, patterning, and etching of structure materials (e.g., alloys or composites) and sacrificial materials. After the final release of the sacrificial materials, the mechanical parts of the structures become moveable.

The structures can be constructed from nickel alloys, which provides durability to the structures. Other materials that provide a similar durability can also be used to fabricate the structures. Such materials includes copper alloys and Co-rich Co—Pt.

In certain embodiments, such as an embodiment described in further detail below, the material from which the structure is fabricated is ferromagnetic and is permanently magnetized.

The structure materials are compatible chemically and mechanically with the sacrificial materials that are be removed to release the mechanical parts of the structures. For example, the Young's modulus of the structure materials is within a certain range of the Young's modulus of the sacrificial materials. In certain embodiments, the Young's modulus of the structure materials is lower than more brittle materials such as silicon, silicon oxide, and silicon nitride.

Due to the Young's modulus of the structure materials, the vanes 52 are flexible. The structure materials provide that the vanes 52 have the flexibility to resist damage due to wind forces and better distribute wind forces to rotate the fan 30.

The deposition steps of the structure materials are alternated with the deposition steps of sacrificial layers. The interfaces between structure materials need to have secure bonding so that the can survive, without damage, during planarization processes such as chemical etching or mechanical polishing. Further, as the sacrificial layers are released in a final step, the structure materials need to be able to resist the etching of specific etchants or etching methods that remove the sacrificial materials.

The present technology can be used in a wide variety of applications. For example, in exemplary embodiments described below, the present technology is described in connection with harvesting wind energy to convert it to usable power. For example, the present technology can be used to generate power to charge a device such as a cellular phone, tablet, and the like. In addition, an array of micro-windmills can be mounted on a wall of a house or building to harvest energy for lighting, security, environmental sensing, and wireless communication.

The present technology can also be applied in connection with generating wind and mixing. For example, the micro-fan can be integrated into a lab-on-chip device or other microfluidic device to act as a high-speed mixer for liquids. Here, the micro-fan can be placed in a mixing chamber of the lab-on-chip and controlled using magnetic fields as described in further detail below. Exemplary lab-on-chip devices include those for drug mixing, blood separation, and performing biochemical reactions for assays.

According to an exemplary embodiment, a micro-system 100 includes the windmill 10. In this embodiment, referring to FIG. 4, a hinge-type arrangement connects the substrate 20 to the fan 30. Here, the hub 50 is ring-shaped (e.g., a barrel element of a hinge) with a hole 102. A pin 110 is fixed to the substrate 20. The pin 110 is mushroom-shaped, including a shaft 112 and a cap 114. The shaft 112 extends through the hole 102.

In this example, the cap 114 is and the top layers 64 of the vanes 52 are formed in the same layer and separated; the shaft 112 and the layers 60, 62 of the vanes 52 are formed in the same layers and separated; and the ring-shaped hub 50 and the bottom layers 60 of the vanes 52 are formed in the same layers and connected. The ring-shaped hub 50 is configured to rotate around the shaft 112 and is held on the shaft 112 by the cap 114 and the substrate 20. Thereby, the fan 30 can rotate around the shaft 112.

The micro-system 100 is fabricated from a ferromagnetic material and the vanes are permanently magnetized. For example, vanes 52 have opposite polarization. As such, as the fan 30 rotates, an alternating magnetic field is generated.

Figure 6:
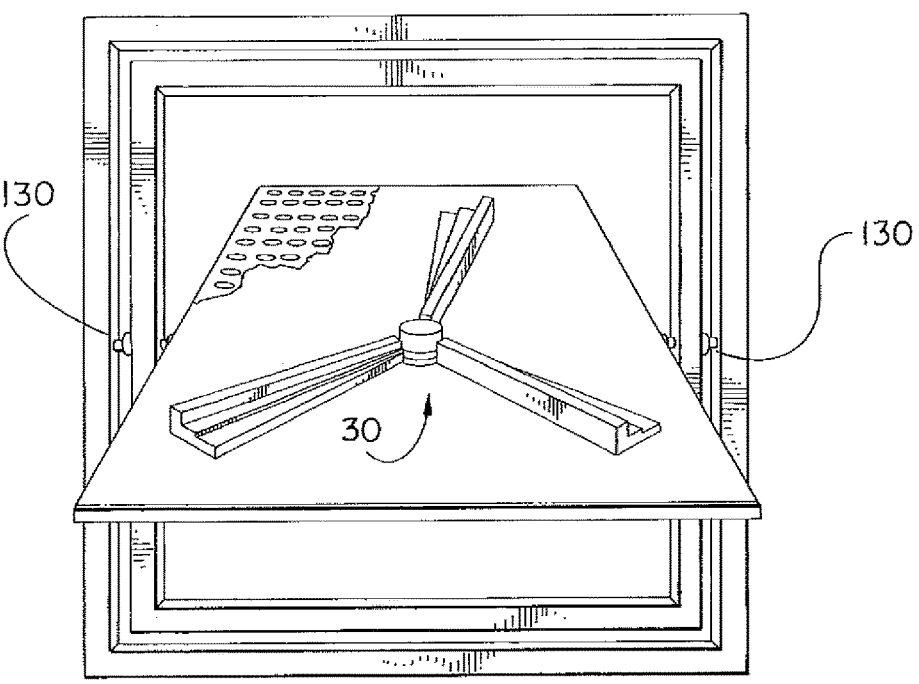
FIG. 6 illustrates a perspective view of the micro-system of FIG. 5.

Referring to FIGS. 5 and 6, the micro-system 100 further includes coils 120, 122 that are defined in the same layer as the substrate. The coil 120 is connected to the substrate 20 by gimbals 130 on opposite sides of the substrate 20 and the coil 122 is connected to the coil 122 by gimbals 130 on opposite sides of the coil 120. In alternative embodiments, the coil 120 can be connected to other opposite sides of the substrate 20 and/or the coil 122 can be connected to other opposite sides of the coil 120. Additionally, the micro-system can include on coil or more than two coils.

The coils 120, 122 can be positioned such that the magnetic field of the fan 30 generates an electrical current in the coils 120, 122. For example, as shown in FIG. 6, the coils 120, 122 are positioned, (e.g. pivoted around the gimbals 130) by magnetic fields or manually, such that a plane of each of the coils 120, 122 is orthogonal to a plane in which the fan 30 rotates (or the plane defined by the substrate 20). The coils 120, 122 are locked into the orthogonal position. The coils 120, 122 may generate currents at other positions. However, the coils 120, 122 are generally most efficient at an orthogonal position.

According to a wind energy harvesting application, when air flows over the vanes 52, the fan 30 rotates around an axis defined by the shaft 112. Because the material used in the fabrication of the micro-system 100 is ferromagnetic and the vanes 52 are magnetized, the rotation of the fan 30 creates alternating magnetic field variations. The alternating magnetic field variations creates alternating electrical current in the coils 120, 122 similar to the way an alternator converts mechanical energy to electrical energy.

According to an actuator application, an electrical current is applied to the coils 120, 122, generating an electromagnetic field that moves the magnetized vanes 52 of the fan 30. The electrical current includes phase shifts such that the fan 30 is continuously rotated to create air flow. For example, the air flow can be used to cool electronics, mechanical devices, structures, or other features.

Referring to FIG. 7, a micro-system 200 includes an array 210 of micro-windmills 10 is illustrated (two windmills are illustrated and additional windmills are represented by dashed lines). Each micro-windmill 10 is formed in a substrate 20. The windmills 10 are substantially similar to the windmill of the micro-system 100 and are not described in detail. A coil 120 is configured to be orthogonally positioned adjacent each of the micro-windmills 10. The coil 120 is connected between portions of the substrate 20 by gimbals 130.

Referring to FIGS. 8-22, micro-systems in which coils and vanes are arranged in order to convert mechanical energy of a fan into electrical energy are illustrated.

Referring to FIGS. 8-13, a micro-system includes a coil 120 that is fabricated by using a sacrificial layer 250 with patterns on top of the windmill 10. At a step illustrated in FIGS. 8-11, a metal for the coil 120 is electroplated. At a step illustrated in FIGS. 10-13, the sacrificial layer 250 is then removed leaving behind the vertical coil 120 orthogonal to the vanes of the fan 30.

Referring to FIGS. 14-15, a micro-system includes a coil 120 that is a solenoid. The coil 120 is connected to an interconnect layer 260 and is suspended over a windmill 10. As the magnetized vanes of the windmill 10 rotate, currents are generated in the solenoid 120, which can be harvested.

Referring to FIGS. 16 and 17, radial planar coils 120 are fabricated (e.g., using a process similar to the windmills) on a substrate 270 and assembled to be positioned adjacent a windmill 10 such that the coils 120 are orthogonal to the plane of the vanes of the windmill 10. Several such coils 120 can be interconnected on an array of windmills 10.

Figure 18:
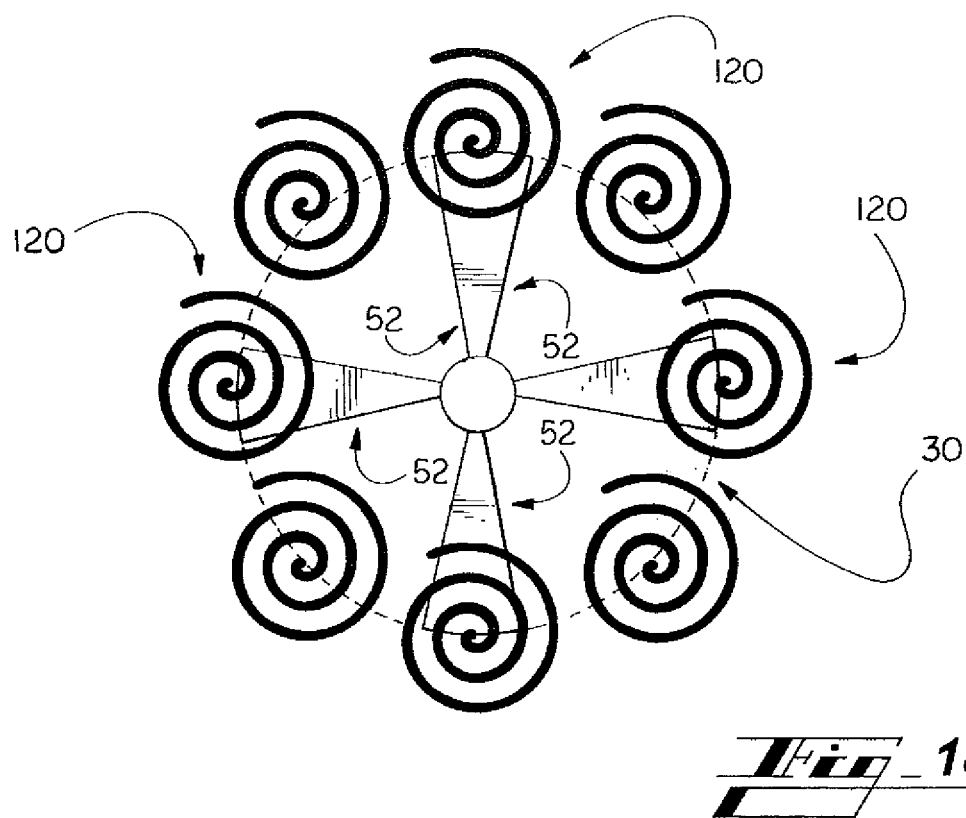
FIG. 18 illustrates a top schematic view of elements of a micro-system including a micro-windmill and an array of coils, according to an embodiment of the present disclosure.
Figure 19:
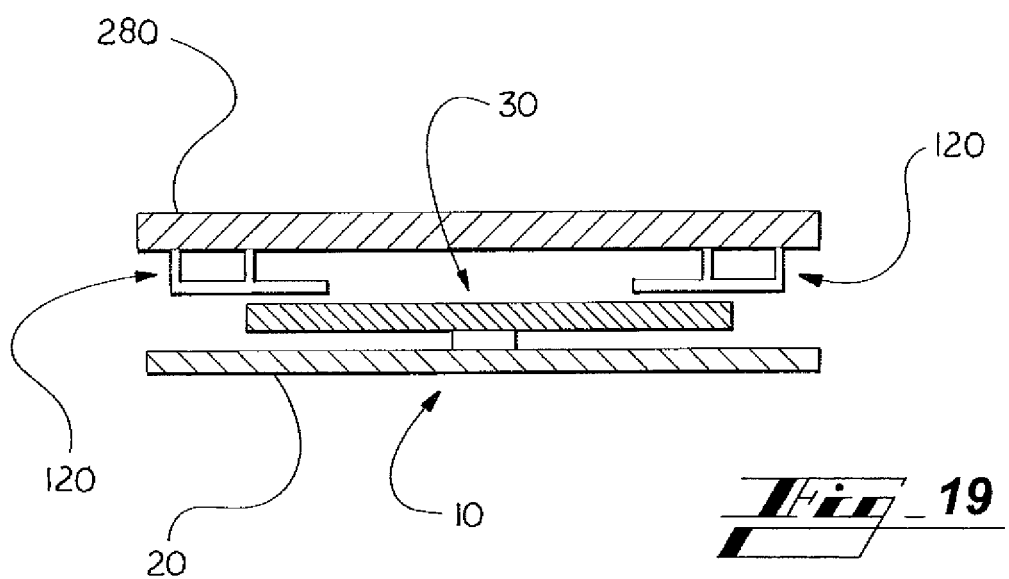
FIG. 19 is a front view of the micro-system of FIG. 18.

Referring to FIGS. 18-22, in each micro-system, an array of spiral coils 120 is positioned around the periphery of a windmill 10. Referring to FIGS. 18 and 19, the spiral coils 120 are connected to an interconnect layer 280 and positioned above a windmill 10. Referring to FIGS. 20 and 21 a substrate 20 is formed on an interconnect layer 290 and the spiral coils 120 are formed on the interconnect layer 290 at the outside edge of the windmill 10. FIG. 22 shows an arrangement similar to the arrangement of FIG. 21 except interconnection lines of the interconnect layer 290 are formed in the substrate 20.

In all the examples above, the vanes 52 of the windmill 10 are be magnetized with each vane 52 having opposite polarities along their length (North near the hinge and South near the free end or vice versa) or the top and bottom of the vanes 52 are magnetized with opposing polarity. In either scenario, neighboring vanes 52 are of opposing polarity and electrical connections are made through the interconnect layer or substrate.

Figure 23:
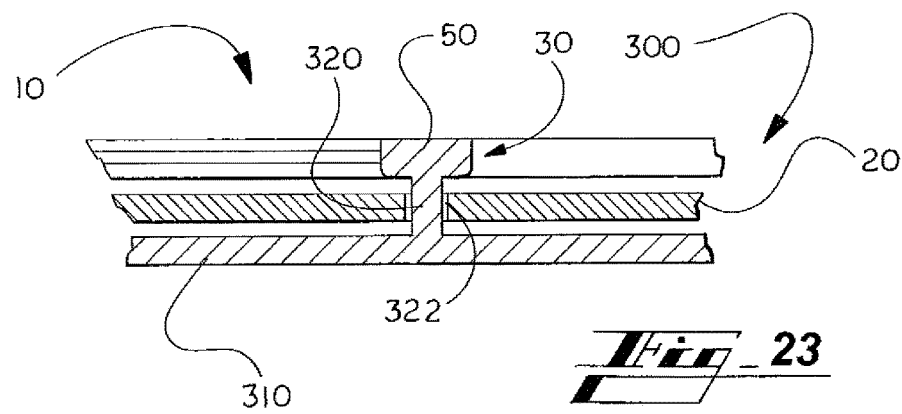
FIG. 23 is a front view cross-sectional view of a micro-system including a micro-windmill and a gear, according to an embodiment of the present disclosure.

Referring to FIG. 23, according to an exemplary embodiment, a micro-system 300 includes the windmill 10 and a gear 310. In this embodiment, a hinge-type arrangement connects the substrate 20 to the fan 30 and the gear 310. Here, the hub 50 of the fan 30 is connected to a hub 312 of the gear 310 by a shaft 320. Each of opposite ends of the shaft 320 is fixed to a respective one of the hubs 50, 312 and the shaft 320 is extends through a hole 322 in the substrate 20. The shaft 320 is configured to rotate in the hole 322. The fan 30 and the gear 310 are fixed to the shaft 320, and rotate on opposite sides of the substrate 20.

A micro-electrical motor can drive the gear 310 to rotate the fan 30 and generate airflow.

Figure 24:
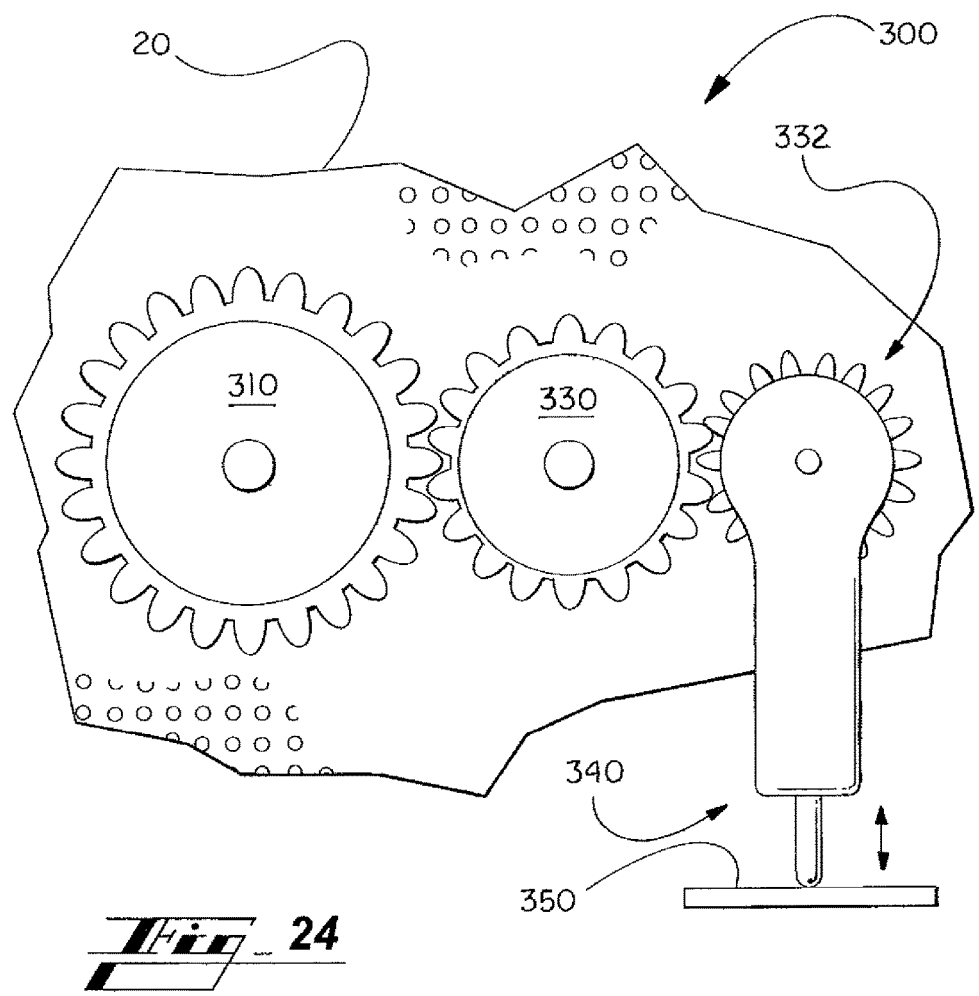
FIG. 24 is a bottom view of the micro-system of FIG. 23 including additional gears and an actuator.

Similarly, airflow over the fan 30 rotates the fan 30 and the gear 310. Referring to FIG. 24, the gear 310 can be connected to other gears 330, 332 or other parts of a MEMS device to actuate the MEMS device through using force. The gear 332 drives an actuator 340 that moves back and forth and the gear 332 turns. The actuator is configured to push a piezo-electric film or material 350 to generate electricity. The gears 330, 332 are smaller to move the actuator 340 faster and thereby generate more electricity.

Various embodiments of the present disclosure are disclosed herein. The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:
1. A micro-system, comprising:
a micro-windmill, comprising:
   a substrate; and
   a fan comprising a plurality of structural layers deposit and patterned on the substrate, the fan comprising:
      a hub; and
      a plurality of vanes attached to the hub;
   wherein each of the hub and the plurality of vanes comprises at least one of the plurality of structural layers; and
   wherein the fan is configured to rotate in a first plane relative to the substrate; and the substrate defines a second plane, wherein the first plane and the second plane are substantially parallel to one another; and
a coil;

wherein the fan is formed from a ferromagnetic material and each vane is magnetized;

wherein neighboring vanes have opposite polarities; and wherein the coil is configured to be rotated to be positioned such that:

a third plane defined by a loop of the coil is orthogonal to the first plane; and the third plane intersects the hub; and wherein rotation of the fan creates an alternating magnetic field at the coil.

2. The micro-system of claim 1, wherein the substrate includes a plurality of holes that are positioned in an area of the substrate over which the vanes are configured to rotate.

3. The micro-system of claim 1, wherein at least one vane of the plurality of vanes includes at least one vertical step between a first leading edge of the at least one vane and a second trailing edge of the at least one vane, each step including:

a distance between outer-facing exposed surfaces of two of the plurality of structural layers, the outer-facing exposed surfaces facing away from the substrate, the distance being measured orthogonal to the second plane defined by the substrate; and a step edge that extends radially from the hub to a free end of the at least one vane and is offset from the first leading edge and from the second trailing edge.

4. The micro-system of claim 3, wherein an area of a vane portion of a first of the two of the plurality of structural layers is smaller than an area of a vane portion of an underlying area of a vane portion of a second of the two of the plurality of structural layers.

5. The micro-system of claim 1, wherein each vane is magnetized with opposite polarities along their length or opposite polarities top-to-bottom.

6. The micro-system of claim 1, wherein the coil is rotably connected to the substrate, wherein the loop of the coil defines the third plane that intersects the hub when the coil is rotated such that the third plane is orthogonal to the first plane.

7. The micro-system of claim 1, wherein a shaft is fixed to the substrate and the hub includes a ring that is configured to rotate around the shaft.

8. The micro-system of claim 1, wherein the fan is monolithic.

9. The micro-system of claim 1, wherein the plurality of structural layers are stacked vertically.

* * * * *